United States Patent Office 3,440,206
Patented Apr. 22, 1969

3,440,206
ROOM TEMPERATURE CURING ORGANOPOLY-SILOXANE ELASTOMERS
Kailash Chandra Pande, Adrian, Mich., and Richard Eugene Ridenour, Sylvania, Ohio, assignors to Stauffer Chemical Company, New York, N.Y., a corporation of Delaware
No Drawing. Filed Nov. 2, 1965, Ser. No. 506,126
Int. Cl. C08g 47/02, 31/02
U.S. Cl. 260—37    8 Claims

ABSTRACT OF THE DISCLOSURE

Reacting tri alkyl siloxy end blocked, acyloxy siloxanes and siloxane diols yields polymers useful as RTV elastomers.

This invention relates to preparations of essentially paste-like consistency which upon exposure to atmospheric moisture at normal temperatures become converted to a solid elastic state.

Such preparations are referred to in the art as room temperature vulcanizing (RTV) compositions and find utility, for example, in mold making, in coating operations and in the construction industry for caulking. They are commonly laid down as from a pot or a specially designed tube.

Preparations of the type herein fall into two categories. In the one case, the commercial package comprises two containers, one for the base composition, the other containing a catalyst which must be admixed with the base material to induce proper curing of the latter. Preparations of the second category do not require a catalyst, which is to say that they are self-curing.

Compositions conforming to the present invention fit into the last described category and are distinguished in that they comprise as the moisture activated component an organopolysiloxane material according with the formula (a)

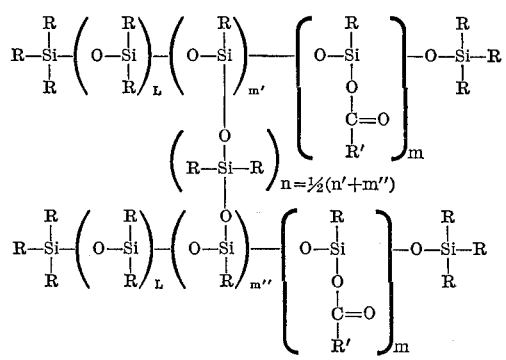

in which R is a monovalent hydrocarbon radical, preferably methyl, less preferably phenyl, a halogenated hydrocarbon radical, or a cyanoalkyl radical, R' is hydrogen or an alkyl or halo-alkyl radical of not more than four carbon atoms and L, m, m' and m'' are integers the total of which is sufficient to yield a viscosity of from about 500 to about 500,000 centipoises.

It is to be understood the organopolysiloxanes embraced by the definition supra need not be block polymers which is to say that the bracketed groups in the two straight chains may be randomly intermixed.

In the practice of the invention, the cross-linked acyloxy-substituted organopolysiloxane is prepared by reacting an hydroxy end-blocked organopolysiloxane fluid with a linear aclyoxy-substituted organopolysiloxane:

(b)

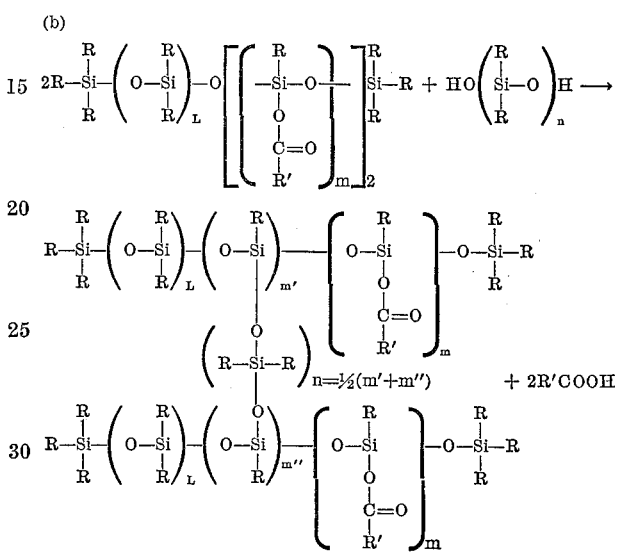

As indicated, the cross-linking occurs with the sacrifice of one or more pairs of acyloxy groups, giving rise to the $m'$ and $m''$ groups.

The linear acyloxy-substituted organopolysiloxane may be derived as by reaction of the corresponding hydrogen-bearing organopolysiloxane with the mercuric acylate containing the desired R' group:

(c)

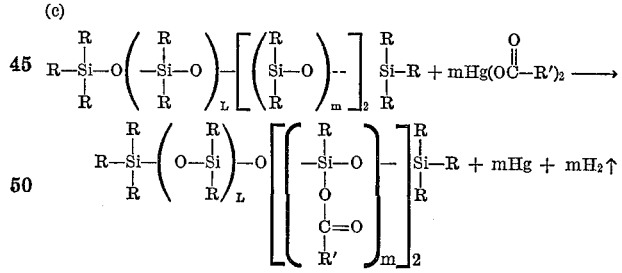

As a matter of convenience, in carrying out reaction (c) the mercuric acylate may be applied dissolved or slurried in a suitable organic solvent, where possible the mono-hydric alcohol or mono-basic acid containing R'. The reaction is executed with constant stirring under a blanket of inert gas, normally, nitrogen, at reflux temperatures.

As indicated by equation (b) the reaction involving the hydroxy end-blocked organopolysiloxane fluid and the acylated linear organopolysiloxane demands by theory the use of at least 2 moles of the latter, but as a matter of practice it has been found that in some cases acceptable results can be achieved using as little as 1.6 moles of the acylated material per mole of hydroxy end-blocked fluid. In general, however, it is preferable to use the acylated material in excess, i.e., 2.5 to 4 moles per mole of hydroxy fluid, 2.5 moles being preferred. This reaction, like reaction (c) is best carried out in the presence of a solvent, pentane for example, and with constant stirring. An inert gas atmosphere, e.g., nitrogen, is desirable to prevent premature moisture-activation of the reaction product with the consequent complications. Alternatively, an atmosphere of desdicated air can be used.

Alternative methods for preparing the acylated linear polysiloxane are available. Thus, in lieu of the above described method, one may react the hydrogen-bearing organopolysiloxane with acetic acid in the presence of a suitable catalyst. Here again one or more solvents are normally employed and a nitrogen blanket used.

On the basis of the results of a large number of experiments, an hydroxy end-blocked fluid in which the organo substituents are methyl groups is preferred in the practice of the invention. As to the acyloxy substituents, acetoxy or propionoxy is preferred. The nature of the acyloxy groups is largely a matter of the extent of the cure period desired or specified. Where a fairly fast cure is required, as is generally true, we employ acetoxy groups. As suggested, it has been found that as a rule the higher the molecular weight of the acyloxy group, the slower the cure. It has further been determined that branched chain groups tend toward a slower cure than their linear counterparts. Thus, by deriving the acyloxy groups from n-butyric acid a faster cure is achieved than when such groups are derived from iso- or t-butyric acid.

As indicated by the viscosity range previously recited, the extent to which the hydroxy end-blocked organopolysiloxane material is polymerized may vary widely. Thus, $n$ in equation (b) may have a value of as low as 5 (corresponding to a very thin fluid) or as high as 9,000 or more as obtains in the instance of extremely slow-flowing gums. Usually and preferably, the viscosity of the fluid lies within the range 1,500 to 100,000 cps. Mixtures of high and low viscosity hydroxy end-blocked fluids are of course applicable to the invention. Moreover, it should be understood that the hydroxy end-blocked fluid employed may represent either a homopolymer of similar siloxane units or a copolymer of dissimilar units.

In some instances, it may be desirable to modify compositions conforming to the invention in order to achieve special properties. For example, to improve adhesiveness there may be incorporated in the composition a suitable amount of a resinous siloxane. In addition, these resinous siloxanes may be used to decrease the elasticity of the cured composition, which in some cases is a desideratum. Plasticization of the vulcanized compositions, were necessary or desirable, can be achieved using various materials, including trimethyl end-blocked dimethyl siloxanes.

Although the compositions herein can often be applied per se with good effect, they are of greatest commercial interest at present as applied in admixture with various fillers. These may be reinforcing or non-reinforcing, fibrous or non-fibrous. In general, substantially any of the fillers employed in the compounding of silicone rubbers may be used in the practice of the invention. As exemplary of reinforcing fillers may be mentioned: fumed silicas, high-surface area precipitated silicas, silica aerogels and the like. The coarser silicas, as diatomaceous earths and crushed quartz, are examples of non-reinforcing filler materials having application to the invention. In this connection, metallic oxides as titanium oxide, ferric oxide, zinc oxde, etc. also should be noted. Applicable fibrous fillers include asbestos and fibrous glass.

Considering the effect of moisture on the compositions herein, it is manifestly important that the filler material be dry before use for the purposes of the invention. The quantity of filler employed depends on the nature of the particular filler and the properties desired in the final product. In most cases where a filler is used, the same is applied in an amount representing about 40 to about 80 parts by weight, most frequently 50–70 parts by weight, per 100 parts of the organopolysiloxane material.

Where the composition is to be used in caulking, care should be exercised to select a filler which will preclude any tendency of the composition to slump during application or thereafter. The term "slump," of course, refers to gravity-induced flow of such a material with resultant development of areas of non-uniform section.

Apart from fillers as before mentioned, compositions conforming to the invention may contain coloring agents, agents capable of preventing the passage of ultraviolet light, dessicants and antioxidants, for instance. Also, depending upon the use to which the composition is to be put, it may or may not be desirable or necessary to include a dielectric material, graphite for example.

As hereinbefore suggested, compositions conforming to the invention can be tailored to fit various specifications as to cure times. In caulking, for instance, the working time from the pot is more or less conventionally calculated as of the order of 2–2½ hours. Thus to meet this requirement, the starting materials used in the preparation of the composition are so selected that substantial stiffening of the composition will not occur until after expiration of such period of time. Normally, the applied material is tack-free within ½ to 3 hours, is substantially cured after 24 hours and completely cured after 7 days. These periods of course, vary somewhat as to any given composition with changes in humidity and also with changes in temperature. In general, the higher the temperature and humidity the faster the cure.

The compositions herein, assuming proper packaging, show an excellent shelf-life, which is to say that they can be stored for prolonged periods of time without adverse effect.

Normally, the moisture activation of the composition as it is laid down occurs through the influence of the moisture in the ambient air at the work site, but extraneous water vapor may be supplied by any suitable means to hasten the cure where and when desirable. It appears that the curing process proceeds with further cross-linking of the organopolysiloxane polymer units:

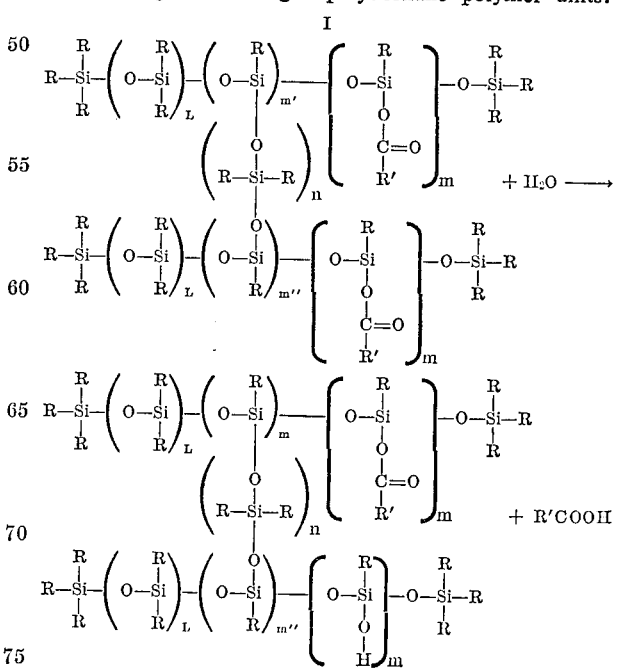

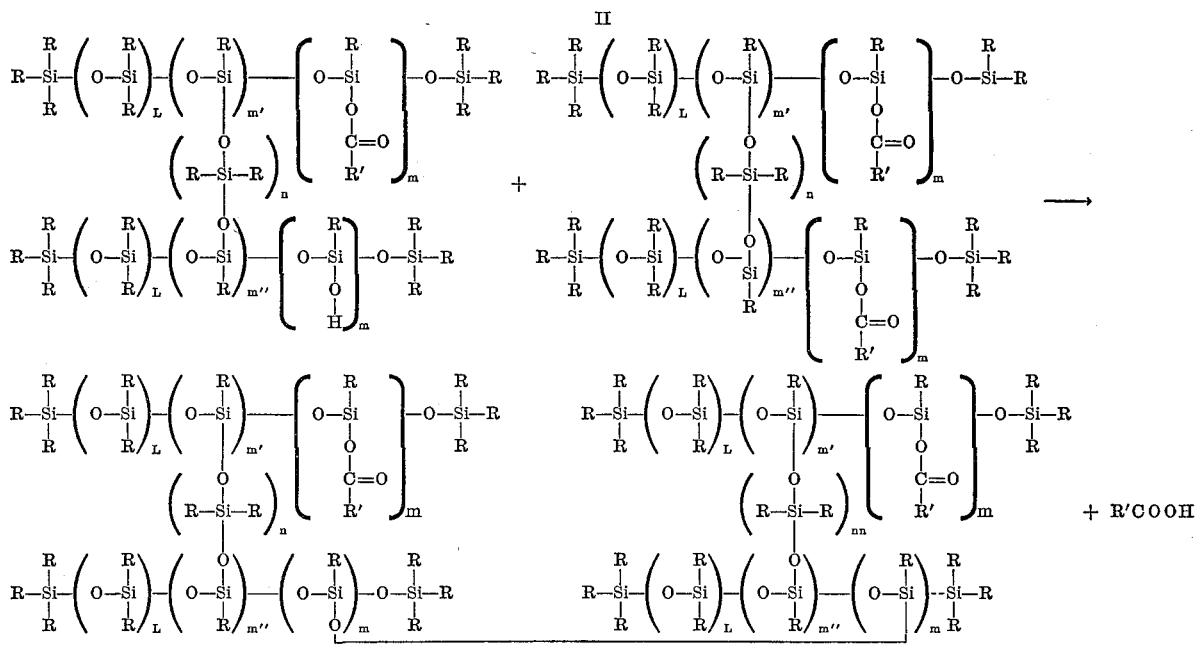

The cross-linked structure is, of course, subject to further cross-linking through hydrolysis of one or more of its acyloxy groups.

The invention is further illustrated by the following examples which are not to be taken as in anyway limitative thereof:

EXAMPLE I

Into a 3 neck 250 ml. round bottom flask fitted with a nitrogen inlet, dropping funnel, condenser and stirrer was placed 40 gm. (0.194 mole) of mercuric acetate dissolved in 150 ml. of absolute methanol. To this was added over a one hour period a mixed methyl-hydrogen organopolysiloxane fluid having a molecular weight of 7850 and containing 26%

units.

The reaction mixture was refluxed for 2 hours, whereafter the solvent was distilled off. The liquid was then decanted and stripped in vacuo.

Infrared analysis showed no residual Si—H bonds and a large

bond at 1721 cm.$^{-1}$.

EXAMPLE II

The procedure of Example I was repeated with the exception that acetic acid was used to replace methanol as solvent. The same results were obtained.

EXAMPLE III 5.9 gm. of a hydroxy end-blocked polydimethyl siloxane fluid having molecular weight of 8800 and filled with 4.1 gm. of comminuted iron oxide was mixed with 4.0 gm. of acetoxy fluid, prepared as per Example I, and 100 ml. of pentane. The mixture was refluxed for 1 hour and then vacuum stripped.

A sample of the residue showed some air curing in 1 hour. In 24 hours the curing was complete.

EXAMPLE IV

Into a 250 ml. 3 neck flask fitted with reflux condenser, stirrer and nitrogen inlet was added a solution made up of 30 gm. mixed methyl-hydrogen organopolysiloxane fluid, (approximate molecular weight=7850, containing 26%

groups). 100 gm. of tetrahydrofuran, 50 ml. of acetic acid and 10 ml. of acetic anhydride (water scavenger). To this was added 10 microliters of a saturated solution of $H_2PtCl_6$ in isopropanol.

The reaction was refluxed for 2 hours and vacuum stripped.

Infrared analysis showed a large decrease in Si—H bond and a corresponding increase in

bond at 1720 cm.$^{-1}$.

EXAMPLE V 40 gm. of mercuric acetate were dissolved in 100 ml. of acetic acid. 10 ml. of acetic anhydride were then added (as water scavenger) and the mixture placed in a reaction flask fitted with a stirrer, nitrogen inlet and reflux condenser.

To the flask was then added 36 gm. of mixed methylhydrogen organopolysiloxane fluid having a molecular weight of 7850 and containing 26 mole percent

groups.

The mixture was refluxed for 1 hour, whereafter, following settling, the upper layer was decanted off.

EXAMPLE VI

To 10 ml. of the solution from Example V (upper layer) was added 10 gm. of an hydroxylated fluid of approximate molecular weight 8800 previously filled with 75 parts of comminuted iron oxide per 100 parts of the fluid. This mixture was then refluxed with 50 ml. of pentane for 1 hour and stripped in vacuo.

A sample, upon exposure to atmospheric moisture became tack-free in 1 hour and had substantially completely cured on standing overnight. The cured polymer had good elastomeric properties.

The invention claimed is:
1. An organopolysiloxane according with the formula

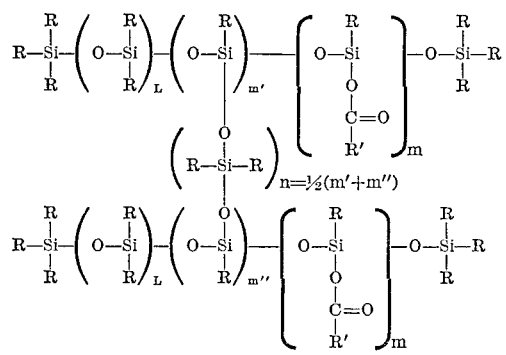

in which R is selected from the class consisting of monovalent hydrocarbon, halo-hydrocarbon and cyano-alkyl radicals, R' is H or an alkyl or halo-alkyl radical of not more than 4 carbon atoms and L, $m$, $m'$, and $m''$ are integers sufficient to yield a viscosity of from about 500 to about 500,000 centipoises.

2. An organopolysiloxane conforming to the formula

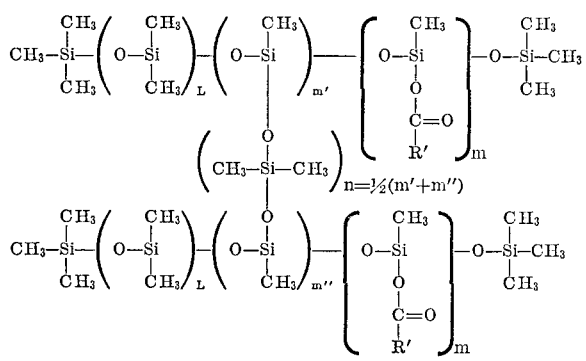

in which R' is H or an alkyl or halo-alkyl radical of not more than 4 carbon atoms and L, $m$, $m'$ and $m''$ are integers sufficient to yield a viscosity of from about 500 to about 500,000 centipoises.

3. A composition comprising an organopolysiloxane in accordance with claim 1 and incorporating a filler material.

4. A composition comprising an organopolysiloxane in accordance with claim 2 and incorporating about 40 to about 80 parts by weight of a filler material per 100 parts of the organopolysiloxane.

5. A composition comprising an organopolysiloxane in accordance with claim 2 and incorporating about 50 to about 70 parts by weight of a filler per 100 parts of the organopolysiloxane.

6. An organopolysiloxane conforming to the formula

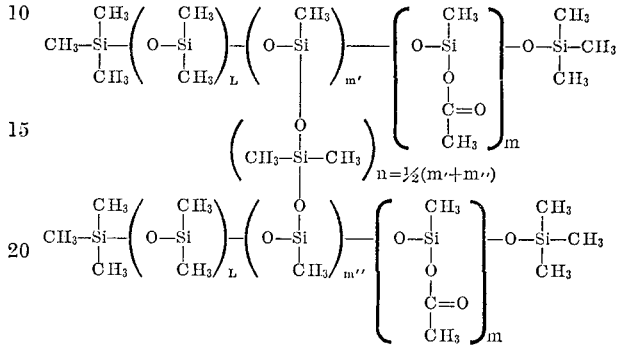

in which $n$ has a value between about 5 and about 9,000 and L, $m$, $m'$ and $m''$ are integers the total of which is sufficient to yield a viscosity of from about 500 to about 500,000 centipoises.

7. A composition comprising an organopolysiloxane in accordance with claim 6 and incorporating from about 40 to about 80 parts by weight of filler material per 100 parts of the organopolysiloxane.

8. An organopolysiloxane in accordance with claim 1, 2 or 6 where $n$ has a value providing a viscosity between 1,500 and 100,000 centipoises.

References Cited
UNITED STATES PATENTS

| | | | |
|---|---|---|---|
| 3,361,714 | 1/1968 | Omietanski | 260—37 |
| 2,658,908 | 11/1953 | Nitzsche et al. | 260—46.5 |
| 3,035,016 | 5/1962 | Bruner | 260—37 |

MORRIS LIEBMAN, *Primary Examiner.*

J. E. CALLAGHAN, *Assistant Examiner.*

U.S. Cl. X.R.
260—46.5, 448.2

UNITED STATES PATENT OFFICE
CERTIFICATE OF CORRECTION

Patent No. 3,440,206                                          April 22, 1969

Kailash Chandra Pande et al.

It is certified that error appears in the above identified patent and that said Letters Patent are hereby corrected as shown below:

Column 1, formula (a), that portion of the formula reading "$n=1/2(n+m'')$" should read -- $n=1/2(m'+m'')$ --. Column 2, formula (c), that portion of the formula reading

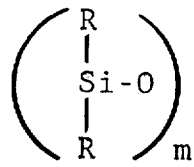      should read      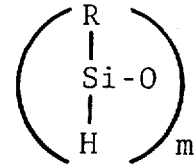

Columns 5 and 6, formula II, that portion of the formula reading

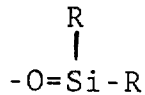      should read      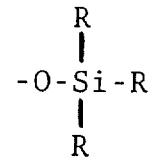

same formula, that portion reading "$)_{nn}$" should read -- $)_n$ --; same formula, that portion reading

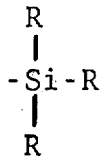      should read      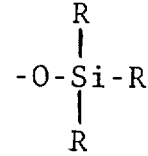

Signed and sealed this 14th day of April 1970.

(SEAL)
Attest:

EDWARD M. FLETCHER, JR.
Attesting Officer

WILLIAM E. SCHUYLER, JR.
Commissioner of Patents